United States Patent Office 3,761,316
Patented Sept. 25, 1973

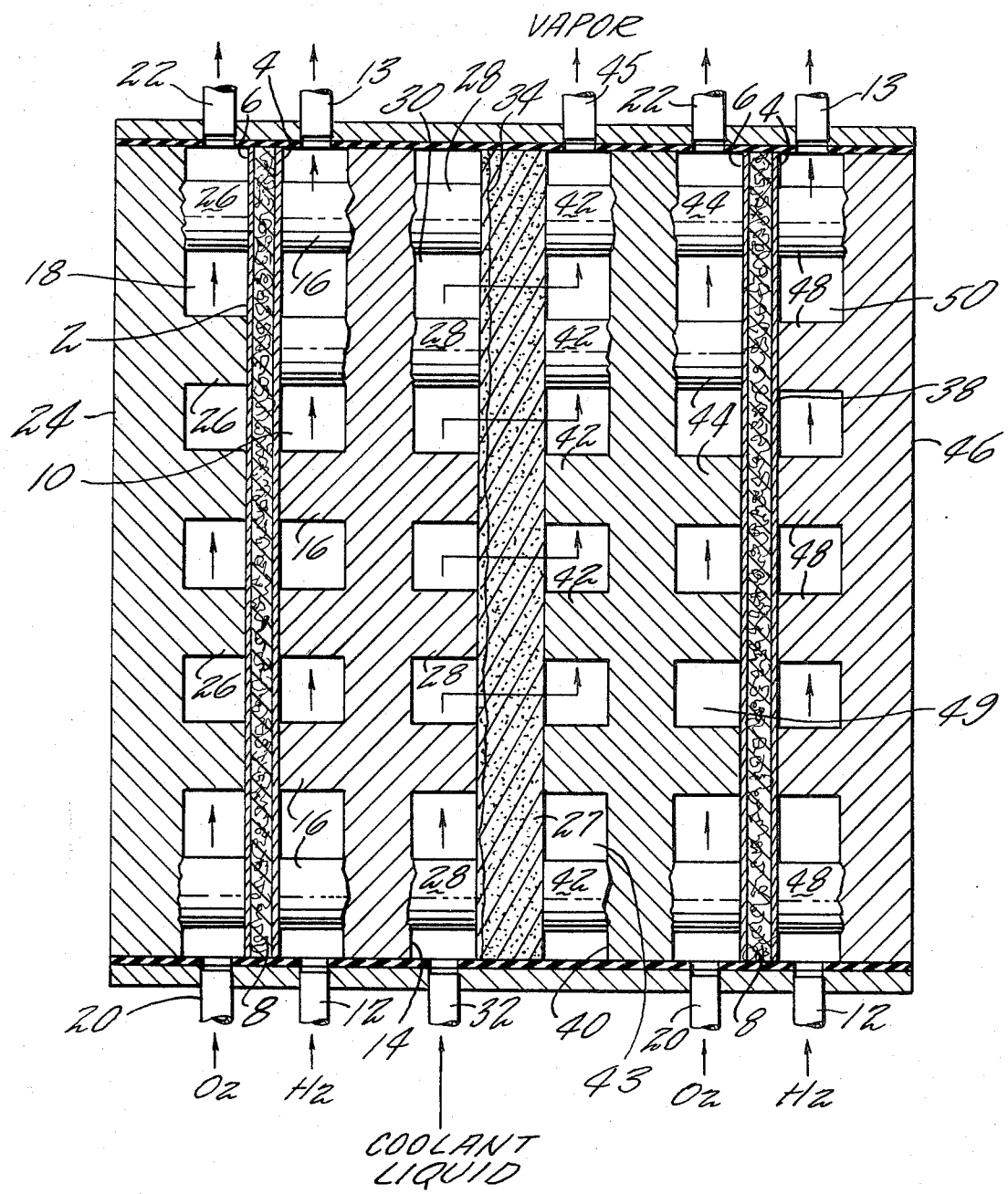

3,761,316
FUEL CELL WITH EVAPORATIVE COOLING
James K. Stedman, Glastonbury, Conn., assignor to United Aircraft Corporation, East Hartford, Conn.
Filed Mar. 29, 1971, Ser. No. 128,773
Int. Cl. H01m 27/00
U.S. Cl. 136—86 R
8 Claims

ABSTRACT OF THE DISCLOSURE

A fuel cell assembly utilizing the waste heat of a fuel cell to provide evaporative cooling of the cell is provided by a hydrophobic separator disposed in heat conducting relationship with the fuel cell. A coolant liquid is fed under pressure to a cavity on one side of the hydrophobic separator, and as vapor evolves from the coolant liquid, it passes through the hydrophobic separator to ambient.

---

The invention herein described was made in the course of or under a contract or subcontract thereunder, with the Department of the Air Force.

BACKGROUND OF THE INVENTION

Field of the invention.—This invention relates to a fuel cell and particularly to a fuel having a hydrophobic separator for separating the liquid and vapor phases for fuel cell waste heat removal.

Description of the prior art.—Previous evaporative cooling systems generally have relied upon the capillary forces in a hydrophilic porous structure, such as a wick, to pump the cooling liquid in a fuel cell to the area between adjacent fuel cells. The hydrophilic structure has the following disadvantages:

any steam that evolves within the wick or liquid feed manifold could block the liquid from the wick, and, because of the resulting high local temperatures, large areas could be depleted of liquid; any noncondensible gases entering the system with the cooling liquid could also, upon evolving from the liquid, cause blockage of the liquid; and the capillary type wick is very sensitive to adverse gravity forces.

My invention obviates the above mentioned disadvantages and provides a fuel cell heat removal system which utilizes the latent heat of vaporization of a liquid, such as water, to remove the waste heat from the fuel cell.

SUMMARY OF THE INVENTION

The object of the present invention is to provide an evaporative heat removal system for a fuel cell which efficiently utilizes the latent heat of vaporization of the liquid, such as to water, to remove the waste heat from the fuel cell.

In accordance with the present invention a fuel cell having an evaporative cooling system is provided by a hydrophobic separator disposed between adjacent cells or adjacent a single cell. A cooling liquid is fed under pressure to a cavity on one side of the hydrophobic separator. Waste heat from the fuel cell is transferred to the liquid. Since the hydrophobic separator is non wetting, a liquid vapor interface is established within the separator and vapor leaves from a cavity on the opposite side of the separator. Since the liquid is at a higher pressure than the vapor cavity, any vapor or noncondensible gas bubbles evolved in the liquid cavity tend to pass through the hydrophobic separator to the lower pressure vapor cavity and exit with the evolved vapor.

The hydrophobic separator must be thick enough to withstand a high liquid pressure without blowing or cracking, and its porosity and pore size must be large enough so that the pressure drop of the vapor through the separator is less than the liquid pressure to be held. If the vapor pressure drop rises above that valve, the vapor would back up into the liquid cavity and prevent liquid from entering. On the other hand, pore size must be small enough so that the required liquid pressure does not cause break through (or blowing) of the liquid into the vapor cavity. The ideal pressure difference that can be held without having liquid break through into the vapor cavity is given by the following equation:

where:

$$\Delta P_{L/V} = \frac{2G \cos \theta}{R}$$

G = surface tension of the liquid
$\theta$ = the contact angle between the hydrophobic material and the liquid;
R = pore size radius; and
$\Delta P_{L/V}$ = the differential pressure between the liquid and its vapor.

A hydrophobic separator in accordance with the present invention may be constructed, for example, from a sintered nickel plate which is impregnated with a hydrophobic polymer, or the separator could be constructed entirely from a hydrophobic polymer. The advantage of utilizing a hydrophobic polymer impregnated metal separator is that it is capable of conducting electrical current, whereas most hydrophobic polymers alone do not.

Other objects, features and advantages of the present invention will become more apparent in the light of the following detailed description of a preferred embodiment as illustrated in the accompanying drawing:

BRIEF DESCRIPTION OF THE DRAWING

The sole figure is a sectioned illustration of one embodiment of my invention.

DESCRIPTION OF THE PREFERRED EMBODIMENT

The sole figure is a sectioned schematic illustration of a fuel cell having evaporative cooling in accordance with the present invention. A first fuel cell 2 is shown having an anode 4, a cathode 6 and electrolyte therebetween which may be contained by an electrolyte matrix 8. The fuel cell is provided with a cavity 10 for a fuel gas which may be hydrogen having an inlet 12 and an outlet 13; the cavity 10 is defined by the anode 4 and heat transfer means 14 having pins 16 thereon. Likewise, a cavity 18 for an oxidant gas, which may be oxygen, having an inlet 20 and an outlet 22 is defined by the cathode 6 and end plate 24 having pins 26 thereon.

A hydrophobic separator 27 is disposed adjacent the heat transfer means 14 which have pins 28 thereon to define, with the hydrophobic separator 27, a cavity 30 having an inlet 32 for cooling liquid. A plate 40 having pins 42 thereon is disposed adjacent the hydrophobic separator 27 and defines therewith a cavity 43 having an outlet 45 for vapor.

The portion of the figure described thus far is sufficient to constitute an embodiment of my invention. A coolant liquid is fed under pressure into cavity 30 via inlet 32. A liquid vapor interface 34 is established within the hydrophobic separator, and as the fuel cell waste heat heats the coolant liquid in cavity 30, a vapor evolves which passes through the hydrophobic separator 27 into the cavity 43 and to ambient via outlet 45.

However, it may be desirable to utilize the waste heat of adjacent fuel cells to boil the coolant liquid. Therefore fuel cell 38, which may be the same as the fuel cell 2, is spaced from the plate 40 (which becomes second heat transfer means) by pins 48 thereon, thereby defining a cavity 49 for a reactant gas, which may be oxygen, having an inlet 20 and an outlet 22. End plate 46 having pins 48 thereon is disposed adjacent the second fuel cell 38 with which it defines a cavity 50 having an inlet 12 and an outlet 13 for a reactant gas, which may be hydrogen.

With the addition of the second fuel cell 38, additional waste heat therefrom is transferred to the coolant liquid via the plate 40, including pins 44 and 42, and the hydrophobic separator 27.

As will be understood by those skilled in the art, some means of holding the assembly together must be utilized. For example, the rods extending through the assembly are obvious means for holding it together. They have been omitted for clarity in the drawings.

The hydrophobic separator may be constructed of a porous hydrophobic material, such as polytetrafluoroethylene, or it may be a hydrophobic polymer impregnated metal, such as, for example, tetrafluoroethylene impregnated porous nickel. The latter is advantageously employed when it is necessary for the hydrophobic separator to conduct electrical current, as for example, when the hydrophobic separator is employed between adjacent fuel cells.

I have found that a satisfactory hydrophobic separator comprises a polytetrafluoroethylene impregnated, porous sintered nickel plate, with the separator having a mean pore size of 2 to 4 microns and a porosity of 40 to 60 percent. Preferably it has a mean pore size of about 3 microns and a porosity of about 50%. Other hydrophobic separator constructions, such as a sheet of hydrophobic polymer, such as polytetrafluoroethylene, supported by a porous metal sinter, such as nickel, on the vapor side, could also be utilized.

My hydrophobic separator was able to withstand a pressure differential between the coolant liquid, which was water, and the vapor, which was steam, of about 5.5 p.s.i. without water flowing from the liquid side to the steam side.

There has thus been described a fuel cell having evaporative cooling in accordance with my invention. It will be understood that various changes and omissions in the details thereof, such as the hydrophobic separator material selection and construction, the particular reactant gases and electrolytes used in the fuel cell, and the particular coolant liquid used, may be made therein without departing from the spirit and scope of my invention.

What I claim as novel and desire to secure by Letters Patent of the United States is:

1. A fuel cell assembly utilizing the waste heat of the fuel cell to provide evaporative cooling of the fuel cell, comprising:

a fuel cell, including an anode, a cathode, electrolyte therebetween, a fuel gas cavity having an inlet and an outlet, and an oxidant gas cavity having an inlet and an outlet;

a hydrophobic separator disposed adjacent said fuel cell and spaced therefrom by heat transfer means which are contiguous with said fuel cell and with one side of said hydrophobic separator, said heat transfer means defining, with said fuel cell, one of said gas cavities, and said heat transfer means defining, with said hydrophobic separator, a first coolant cavity having an inlet;

means for supplying a coolant liquid to said first coolant cavity; and plate means disposed adjacent the other side of said hydrophobic separator and defining, with said hydrophobic separator, a second coolant cavity having an outlet.

2. A fuel cell assembly as defined in claim 1, wherein said hydrophobic separator comprises a porous metal impregnated with a hydrophobic polymer.

3. A fuel cell assembly as defined in claim 1, wherein said hydrophobic separator comprises a porous hydrophobic polymer.

4. A fuel cell assembly as defined in claim 2, wherein said hydrophobic separator comprises polytetrafluoroethylene impregnated porous nickel having a porosity of 40 to 60 percent and a mean pore size of 2 to 4 microns.

5. A fuel cell assembly as defined in claim 2, wherein said hydrophobic separator comprises polytetrafluoroethylene impregnated porous nickel having a porosity of about 50 percent and a mean pore size of about 3 microns.

6. A fuel cell assembly utilizing the waste heat of adjacent fuel cells to provide evaporative cooling of the cells, comprising:

a first fuel cell, including an anode, a cathode, electrolyte therebetween, a first fuel gas cavity having an inlet and an outlet, and a first oxidant gas cavity having an inlet and an outlet;

a hydrophobic separator disposed adjacent said first fuel cell and spaced therefrom by first heat conducting means, said first heat conducting means defining, with said first fuel cell, one of said first gas cavities, and said first heat conducting means defining, with said hydrophobic separator, a first coolant cavity;

a second fuel cell, including an anode, a cathode, electrolyte therebetween, a second fuel gas cavity having an inlet and an outlet, and a second oxidant gas cavity, having an inlet and an outlet;

second heat conducting means disposed between said second fuel cell and said hydrophobic separator and defining with said second fuel cell, one of said second gas cavities, and said second heat conducting means defining, with said hydrophobic separator, a second coolant cavity having an outlet for vapor; and means for supplying a liquid under pressure to said first coolant cavity.

7. A fuel cell having evaporative cooling as defined in claim 1, wherein said heat conducting means comprise a plate having a first set of pins contiguous with said fuel cell on a first side of said plate and having a second set of pins contiguous with said hydrophobic separator on a second side of said plate.

8. A fuel cell having evaporative cooling as defined in claim 6, wherein said hydrophobic separator comprises hydrophobic polymer impregnated porous nickel.

References Cited

UNITED STATES PATENTS

| | | | |
|---|---|---|---|
| 3,172,784 | 3/1965 | Blackmer | 136—86 E |
| 3,370,984 | 2/1968 | Platner | 136—86 R |
| 3,515,593 | 6/1970 | Nickols | 136—86 R |
| 3,615,849 | 10/1971 | Hall | 136—86 R |

ALLEN B. CURTIS, Primary Examiner

H. A. FEELEY, Assistant Examiner

U.S. Cl. X.R.

136—86 E